(12) United States Patent
Ekmedžić

(10) Patent No.: US 9,599,143 B2
(45) Date of Patent: Mar. 21, 2017

(54) LOCKING APPARATUS FOR NUT

(71) Applicant: AIRBUS OPERATIONS LIMITED, Bristol (GB)

(72) Inventor: Andrija Ekmedžić, Bristol (GB)

(73) Assignee: Airbus Operations Limited, Bristol (GB)

( * ) Notice: Subject to any disclaimer, the term of this patent is extended or adjusted under 35 U.S.C. 154(b) by 60 days.

(21) Appl. No.: 14/671,103

(22) Filed: Mar. 27, 2015

(65) Prior Publication Data

US 2015/0275955 A1 Oct. 1, 2015

(30) Foreign Application Priority Data

Mar. 31, 2014 (GB) .................................. 1405766.5

(51) Int. Cl.
*F16B 39/10* (2006.01)

(52) U.S. Cl.
CPC .................................. *F16B 39/108* (2013.01)

(58) Field of Classification Search
CPC ...... F16B 39/10; F16B 39/101; F16B 39/108; F16B 39/12; F16B 39/14; F16B 39/24; F16B 39/26
USPC .......................................... 411/119, 120, 122
See application file for complete search history.

(56) References Cited

U.S. PATENT DOCUMENTS

| | | | |
|---|---|---|---|
| 2,887,891 A | 5/1959 | Perez | |
| 5,094,117 A * | 3/1992 | Mikel | F16B 39/10 403/258 |
| 5,618,143 A * | 4/1997 | Cronin, II | B25B 13/48 411/120 |
| 5,674,034 A * | 10/1997 | Bennett | F16B 39/10 411/120 |
| 5,772,373 A * | 6/1998 | Cronin, II | B25B 13/48 411/120 |
| 6,290,442 B1 * | 9/2001 | Peterkort | F16B 41/002 411/120 |
| 7,029,218 B2 * | 4/2006 | Peterkort | F16B 41/002 411/119 |
| 7,389,579 B2 * | 6/2008 | Rode | B25B 27/062 29/252 |
| 7,927,052 B1 | 4/2011 | Varden | |
| 8,016,531 B2 * | 9/2011 | White | F16B 39/10 301/105.1 |
| 8,292,373 B2 * | 10/2012 | Rieger | B60B 27/0005 301/105.1 |
| 8,469,460 B2 * | 6/2013 | Martin, III | B60B 37/10 301/105.1 |
| 9,200,672 B2 * | 12/2015 | Rode | B25B 27/062 |
| 2004/0136806 A1 | 7/2004 | Montgomery et al. | |

(Continued)

FOREIGN PATENT DOCUMENTS

| | | |
|---|---|---|
| DE | 20302843 U1 | 4/2003 |
| DE | 102004030965 A1 | 2/2006 |
| GB | 203204 A | 9/1923 |

OTHER PUBLICATIONS

UK Search Report for GB1405766.5, dated Jul. 10, 2014, 1 page.

*Primary Examiner* — Robert A Delisle
(74) *Attorney, Agent, or Firm* — Nixon & Vanderhye P.C.

(57) ABSTRACT

A lock nut includes a lock tab washer for fixing thereof. One or more tab plates are provided for fixing to a flank face of the nut. The tab plates have a radially inner tab to prevent relative rotation thereof, and provide a secondary locking function. Bolts attach the tab plates, and have individual lock washers.

12 Claims, 6 Drawing Sheets

(56) References Cited

U.S. PATENT DOCUMENTS

2006/0029485 A1\* 2/2006 Weinstein ............... F16B 39/10
          411/121
2007/0052287 A1 3/2007 White et al.
2011/0299956 A1 12/2011 Martensson et al.

\* cited by examiner

LOCKING APPARATUS FOR NUT

RELATED APPLICATION

This application claims priority to GB1405766.5 filed Mar. 31, 2014, which is incorporated by reference in its entirety.

TECHNICAL FIELD

This invention relates to a locking apparatus for a nut, and in particular to a locking apparatus having a primary and a secondary locking function.

BACKGROUND TO THE INVENTION

In machinery it is often necessary to ensure retention of a screw-threaded nut to avoid loosening in service, for example due to machine vibration. In a safety critical application, mechanical locking techniques include the use of locking wire and tab washers. In the latter case a washer is placed under the nut and includes both an anti-rotation element secured on a component other than the nut, and a tab adapted to be bent into engagement with the nut when in the fully tightened condition. Tab washers are single use items and, if correctly fitted, are highly reliable.

A tab washer may constitute a primary mechanical lock for the nut. In some circumstances it is necessary to provide a secondary mechanical lock for the nut. The secondary mechanical lock should preferably be available to be fitted only if a secondary lock is desirable, and furthermore should be retrofittable in cases where the addition of a secondary lock is considered to be necessary.

SUMMARY OF THE INVENTION

According to a first aspect of an embodiment of the invention there is provided locking apparatus for a nut and comprising an annular tab washer and an arcuate tab plate, the annular tab washer being for engagement with one side face of the nut, having a first radially inner tab for engagement with an element adjacent the nut in use, and a radially outer tab for engagement with the radially outer circumference of the nut, and the arcuate tab plate having a planar face for engagement with the other side face of the nut and a second radially inner tab for engagement with the element, the tab plate having an arcuate slot in the planar face to facilitate fixing of the tab plate to the nut.

The one side face of the nut is generally against the component to be retained by the nut, so that the annular tab washer is between the nut and the component in use. The other side face of the nut is generally to the outside, and is thus accessible for fixing of the tab plate when desired.

In one embodiment, the first radially inner tab is adapted to engage an axial extending groove on the exterior of the female threaded part to which the nut is attached in use. The first inner tab may be bent orthogonally to lie in this groove in use.

The second inner tab may also be bent orthogonally to lie over or under the first inner tab in use, and the first and second inner tabs may have substantially the same axial extent and transverse width. In one embodiment the first and second inner tabs face oppositely in use.

In one embodiment of the invention, the annular tab washer has two diametrically opposed first inner tabs, and two of the arcuate tab plates are provided, one for association with each of the first inner tabs. Each the tab plate has a single second radially inner tab.

The arcuate slot of each arcuate tab plate is preferably blind, and in one embodiment is at a substantially fixed radius with respect to a rotational axis of the annular tab washer. The arcuate slot may extend over an angle in the range 60-150°.

According to a second aspect of an embodiment of the invention, there is provided a locking apparatus of the first aspect in conjunction with a lock nut, the lock nut having on one side face a circumferential array of threaded holes at a radius coinciding with an arcuate slot of a tab plate, the arcuate slot exposing two of the holes therethrough in use.

In an embodiment the array comprises threaded holes of the same size and spaced at equal intervals, and preferably six or more the holes are provided.

The nut may include one or more peripheral axially directed slots for engagement in use by a radially outer tab of the lock washer.

According to a third aspect of an embodiment of the invention there is provided a nut and locking apparatus according to the second aspect in conjunction with a plurality of threaded fasteners for fixing one or more arcuate tab plates to the nut via a respective arcuate slot. The threaded fasteners may include individual tab washers each having an anti-rotation leg to engage the outer periphery of a tab plate, and one or more peripheral tabs for engagement with a respective threaded fastener.

According to a fourth aspect of an embodiment of the invention there is provided a first component retained on a second component by a nut and locking washer according to the third embodiment, the element being defined by the second component. In an embodiment of the fourth aspect the second component is a threaded shaft for engagement with the nut, and the element comprises a channel or groove. The channel or groove may be on the periphery of the threaded shaft and directed axially thereof.

BRIEF DESCRIPTION OF DRAWINGS

Other features of the invention will be apparent from the following description of an embodiment shown by way of example only in the accompanying drawings, in which.

DESCRIPTION OF AN EMBODIMENT OF THE INVENTION

Figure 1:
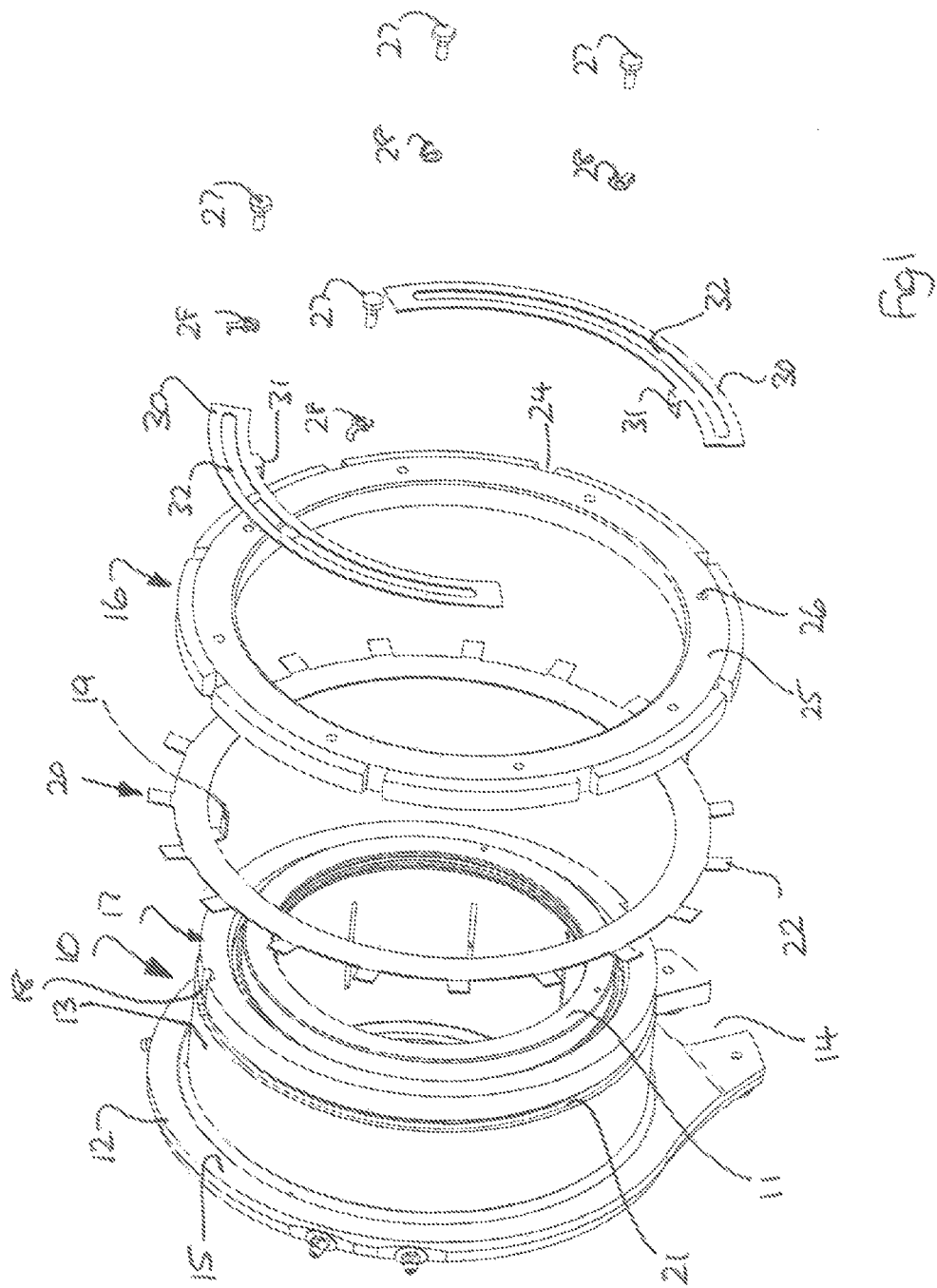
FIG. 1 is an exploded view of locking apparatus according to the invention.
Figure 2:
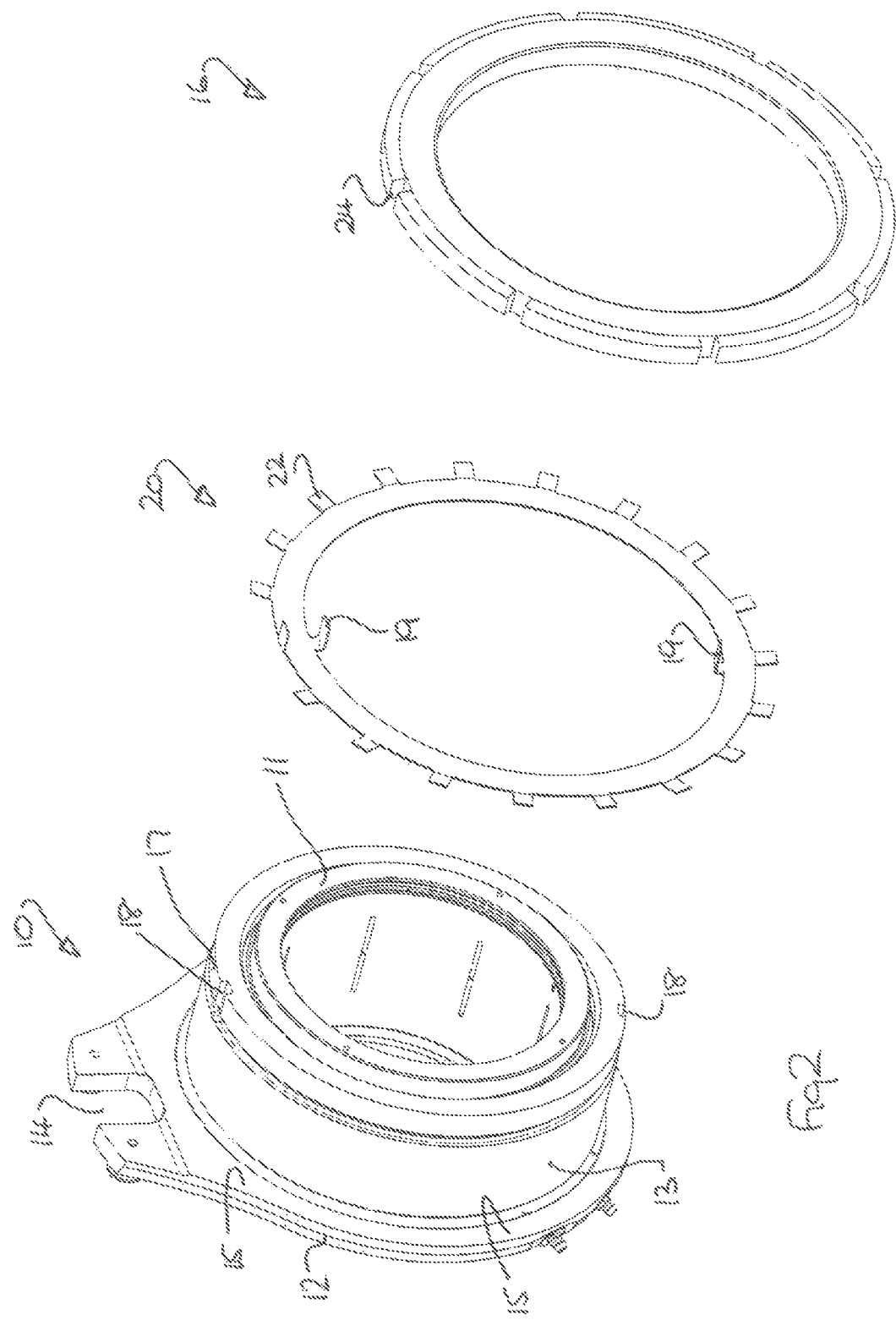
FIG. 2 illustrates a primary locking device for a lock nut, corresponding to FIG. 1.

With reference to the drawings, a self-contained spherical bearing 10 comprises an inner race 11, and outer housing 12 and rolling elements therebetween (not shown). The housing 12 includes an external cylindrical face 13 for press-fitting in the bore of a mounting (not shown) against a shoulder 15, and a fork 14 to ensure non-rotation with respect to this mounting.

In use a tubular shaft (not shown) fits within the inner race 11, and the bearing 10 provides for relative pivotal movement or rotation of the shaft with respect to the housing 12. Although a spherical bearing 10 is illustrated, other kinds of rolling element bearing may also be employed.

In order that the bearing 10 is axially retained in the mounting, a threaded lock nut 16 is provided for engagement with a threaded portion 17 of the external face of the housing 12.

The bearing 10 may for example provide a pivoting support for part of the landing gear of an aircraft.

The housing 12 includes opposite axially directed slots 18 in the threaded portion 17 for engagement with corresponding bent inner tabs 19 of an annular lock washer 20.

As illustrated the inner tabs 19 face axially outwardly of the housing 12, so that one circular face of the lock washer contacts a shoulder 21 of the housing 12 in use. The bore of the lock washer slightly exceeds the outer diameter of the threaded portion 17. The lock washer 20 also includes a circumferential array of radially outwardly directed outer tabs 22. As will be appreciated the lock washer 20 may be stamped from steel sheet, and the tabs bent orthogonally as desired.

Figure 3:
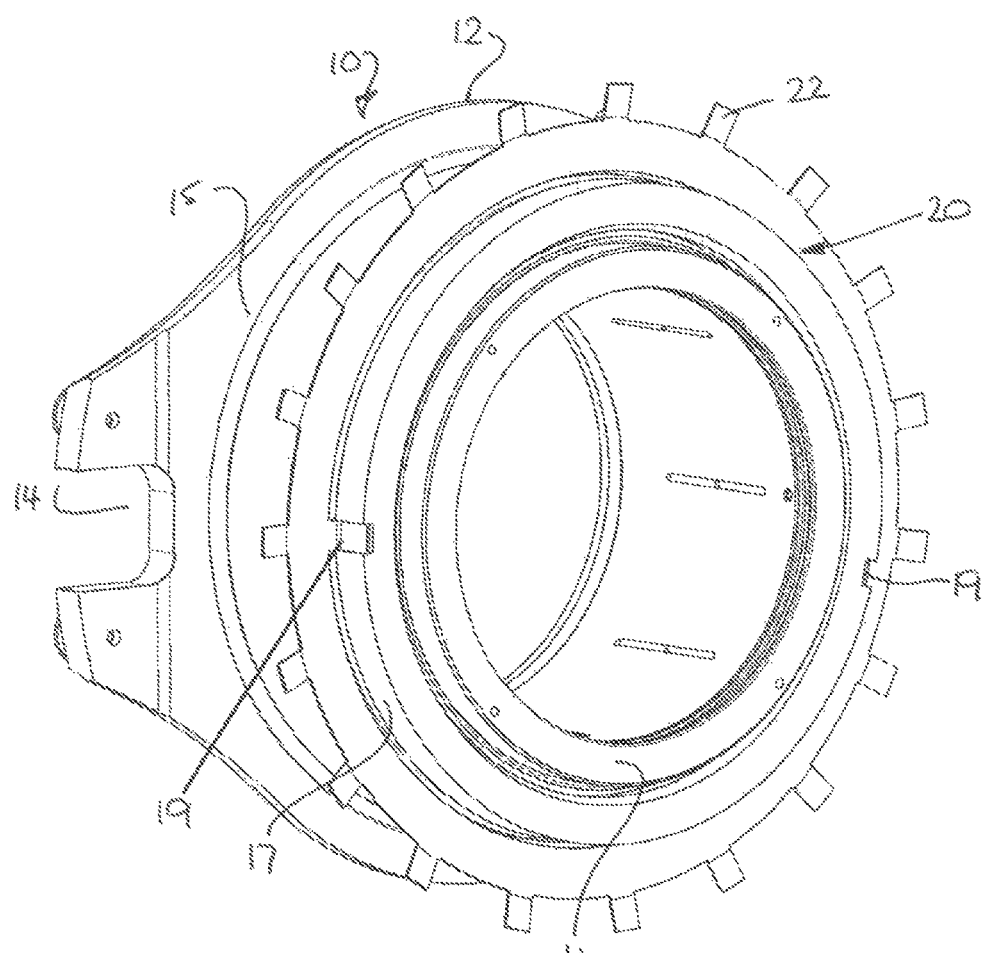
FIG. 3 illustrates a primary locking washer installed on a housing.

In use the lock washer 20 is placed over the threaded portion 17 (as illustrated in FIG. 3), so that the inner tabs 19 engage the corresponding slots 18. Although two slots are provided to ensure redundancy in case of breakage, one tab and one slot may suffice. By this means the lock washer 20 is fixed against rotation relative to the housing 12.

The lock nut 16 has a castellated outer circumference comprising a plurality of equispaced slots 24. The slots 24 have the purpose of being engageable by a C shaped or peg spanner or the like for the purpose of tightening and releasing the nut, in use. The slots are also engageable by at least one outer tab 22 of the lock washer 19, and for this purpose the number and pitch of the outer tabs is different to the number and pitch of the corresponding slots 24; by this means it can be assured that one outer tab and one slot will substantially align in use.

Figure 4:
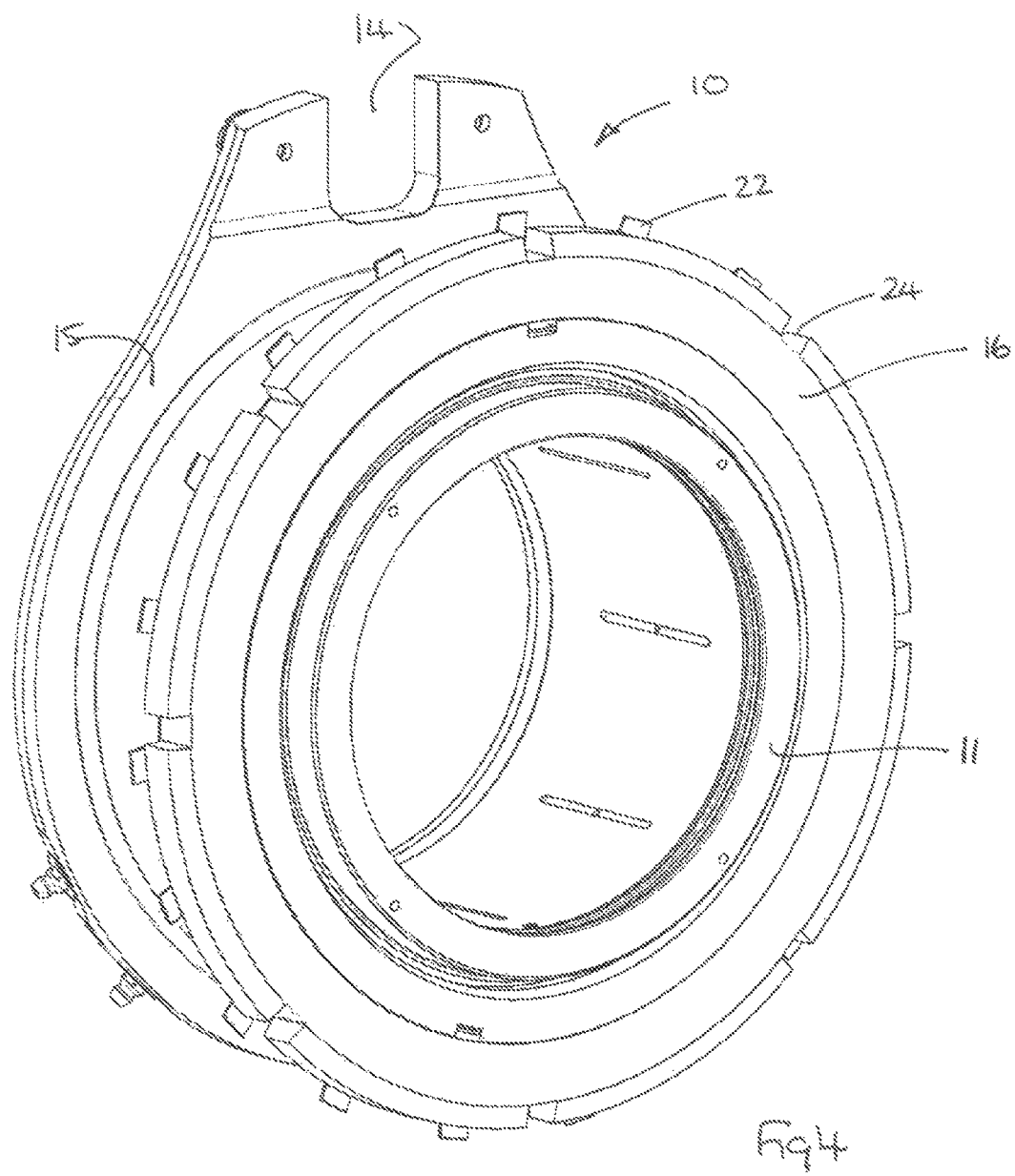
FIG. 4 illustrates the arrangement of FIG. 3 with added lock nut.
Figure 5:
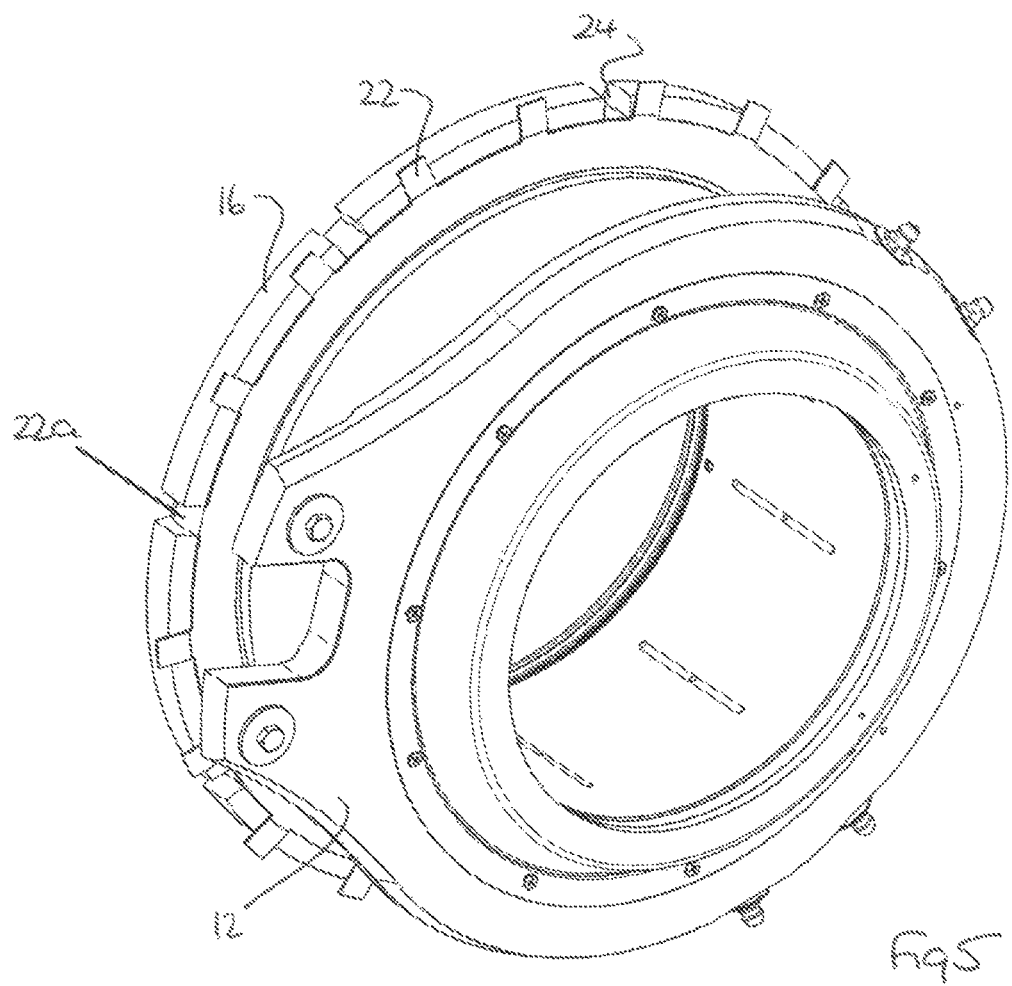
FIG. 5 illustrates from the reverse side the arrangement of FIG. 4 with lock tab engaged.

After on-screwing and tightening of the nut 16 (FIG. 4), one or two outer tabs 22*a* are bent over to engage an adjacent slot 24 (FIG. 5). By this means the nut 16 is locked conventionally against rotation with respect to the lock washer 20 and, by virtue of the inner tabs 19, against rotation relative to the housing 12.

In order to provide a subsidiary lock to guard against unscrewing of the lock nut 16, an additional locking device is provided, which will now be described.

Two identical arcuate locking plates 30 are provided, each consisting for example of a metal stamping and having an internal tab 31. Each plate is intended to lie in use against the outer flank face 25 of the nut 16 between the inner and outer circumference thereof. The internal tab 31 of each plate is bent orthogonally, and in use engages a respective slot 18 of the housing 12. By this means the plates 30 are fixed against rotation with respect to the housing 12.

Two identical plates 30 are provided in this embodiment for redundancy, although one will suffice as an additional locking device.

Each plate extends arcuately for about 120°—the arcuate extent is not important save that a plurality of plates should preferably not overlap in use.

Each plate 30 includes a circumferentially extending slot 32 having closed ends, as illustrated.

Figure 7:
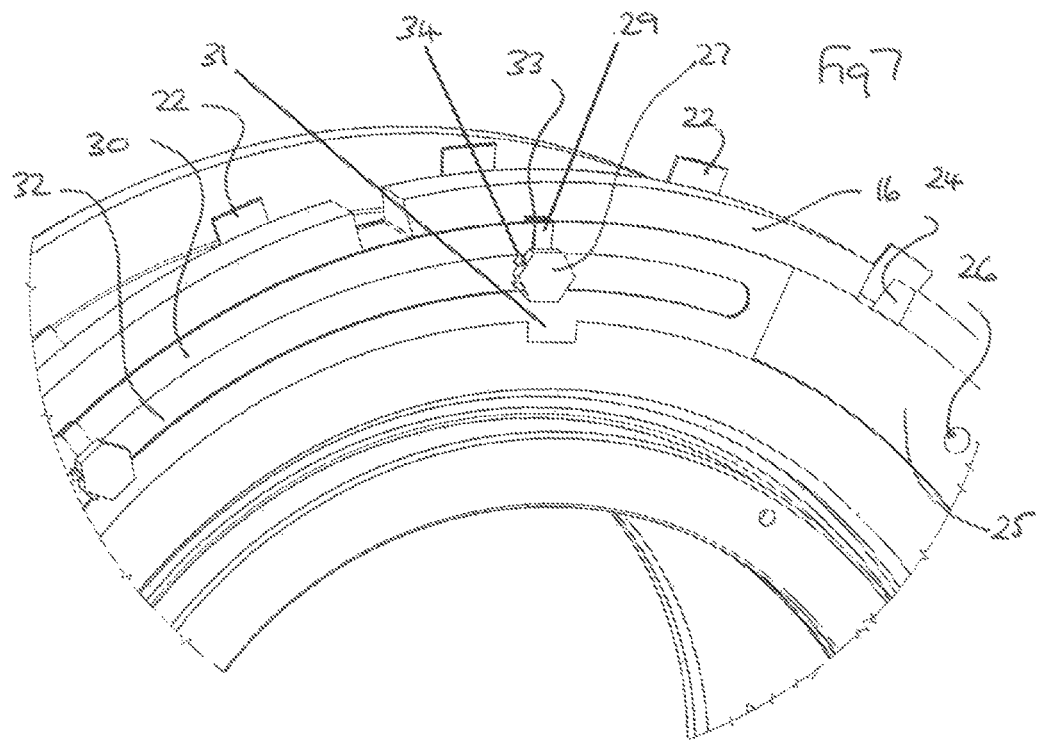
FIG. 7 illustrates the secondary locking device for the arrangement of FIG. 6 in enlarged detailed.

The exposed flank face 25 of the nut is provided with a circumferential array of equispaced threaded holes 26 which are intended to receive threaded screws 27 each having a hexagonal head. In use the screws 27 pass through a slot 32 to retain a plate 30 on the nut 16. Each screw 27 has a lock washer 28 to be placed under the head thereof, and each lock washer has a long tab 29 with a lip 33 to bear closely against the outer circumference of an arcuate plate 30 (FIG. 7); by this means the lock washer 28 is prevented from rotation relative to the axis of the screw 27. Each lock washer 28 also has short tabs 34 for bending up against one or more flats of the respective screw 27 (FIG. 7) after tightening thereof. Other kinds of screw head are possible, and against which a suitably shaped locking tab may engage.

Since the screws 27 clamp the plates 30 against movement relative to the nut 16, and the plates 30 are themselves fixed against rotation relative to the housing 12, the nut 16 is locked by secondary means (the plates 30) to the housing 12.

Figure 6:
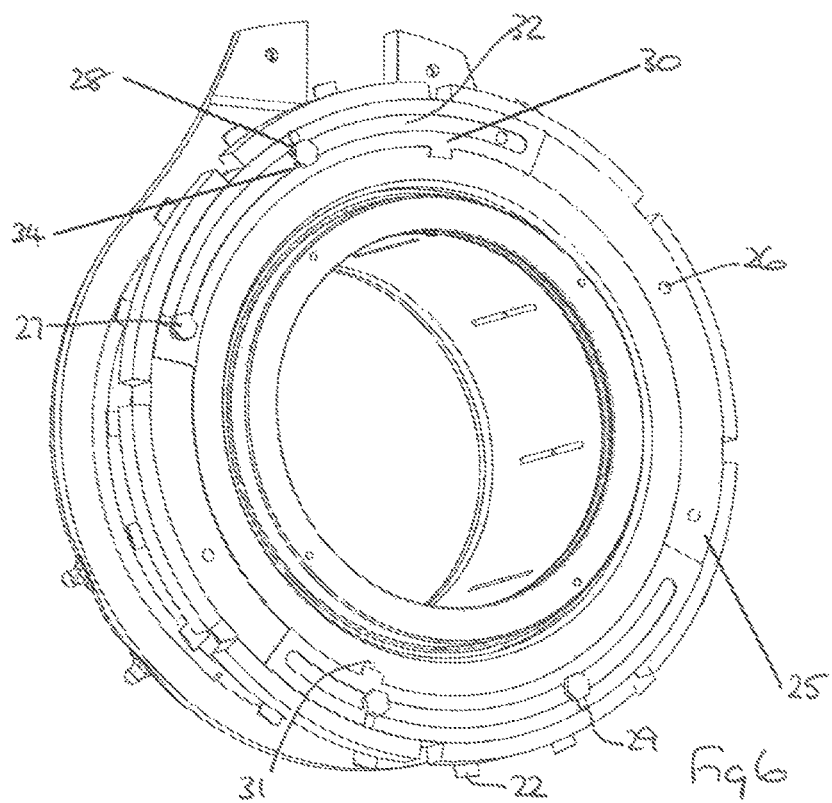
FIG. 6 illustrates a secondary locking device for the arrangement of FIGS. 1 to 5.

The number of threaded holes 26, and the length of the slots 32 are selected to ensure that at least two holes 26 are available to secure each plate 30 (FIG. 6). Each slot 32 may, if rotational alignment permits, be adapted to receive three screws 27.

The plural screws 27 associated with each slot 32 ensure that each plate is securely retained. Moreover in the unlikely event of failure of the locking tabs 22, any relative unscrewing of the nut 16 is limited to the arc between the end of a slot 32 and the nearest screw 27 in the unscrewing direction.

It will also be observed that the additional locking device may be retrofitted provided that a replacement nut 16 is available with threaded holes 26, or an existing nut 16 is removed for machining of threaded holes therein.

Modifications and alterations to the invention are envisaged within the scope of the claims appended hereto.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A locking apparatus for a nut comprising:
    an annular tab washer and an arcuate tab plate, wherein the annular tab washer is configured to engage one side face of the nut,
    the annular tab washer includes a first radially inner tab configured for engagement with an element adjacent the nut and a radially outer tab configured for engagement with the radially outer circumference of the nut, and
    the arcuate tab plate includes a planar face configured for engagement with the other side face of the nut, a second radially inner tab configured for engagement with the element, and an arcuate slot in the planar face configured to facilitate fixing of the tab plate to the nut.

2. The locking apparatus according to claim 1 wherein the first and second radially inner tabs overlie each other.

3. The locking apparatus according to claim 2 wherein the first and second radially inner tabs extend substantially axially of the annular tab washer.

4. The locking apparatus according to claim 1 wherein the annular tab washer comprises a plurality of equispaced radially outer tabs.

5. The locking apparatus according to claim 1 wherein the annular tab washer comprises two of the first radially inner tabs.

6. The locking apparatus according to claim 5 wherein the two first radially inner tabs are diametrically opposed.

7. The locking apparatus according to claim 1 and comprising one annular tab washer and two arcuate tab plates.

8. The locking apparatus according to claim 1, and further comprising a locking nut, the nut including castellations around the outer periphery thereof, a radially outer tab configured for engagement in one of the castellations, and the nut including a circumferential array of threaded fasteners on the other side face whereby an arcuate tab plate may be secured via an arcuate slot thereof.

9. The locking apparatus according to claim 8 wherein the arcuate slot extends over three fasteners of the array.

10. The locking apparatus according to claim 8 wherein the fasteners are equispaced.

11. The locking apparatus according to claim 8 wherein each of the fasteners comprises a female screw thread in the nut.

12. A locking apparatus for a nut comprising:
an annular tab washer and an arcuate tab plate, wherein the annular tab washer is configured to engage one side face of the nut,
the annular tab washer includes a first radially inner tab configured for engagement with an element adjacent the nut and a radially outer tab configured for engagement with the radially outer circumference of the nut, and
the arcuate tab plate includes a planar face configured for engagement with the other side face of the nut, a second radially inner tab configured for engagement with the element, and an arcuate slot in the planar face configured to facilitate fixing of the tab plate to the nut,
a locking nut, the nut including castellations around the outer periphery thereof, a radially outer tab being for engagement in one of the castellations, and the nut including a circumferential array of threaded fasteners on the other side face whereby an arcuate tab plate may be secured via an arcuate slot thereof, wherein each of the fasteners comprises a female screw thread in the nut, and
a male screw-threaded component for respective engagement with a female screw thread, and a lock washer for each the male component, each the lock washer comprising a first tab for anti-rotational engagement with an arcuate tab plate, and a second tab for anti-rotational engagement with the respective male component.

\* \* \* \* \*